US008549465B2

(12) United States Patent
Allen et al.

(10) Patent No.: US 8,549,465 B2
(45) Date of Patent: Oct. 1, 2013

(54) AUTOMATED DEFECT CLASSIFICATION FOR PROGRAM CODE

(75) Inventors: Corville O. Allen, Morrisville, NC (US); Albert A. Chung, Cary, NC (US); Binh C. Truong, Cary, NC (US); Kam K. Yee, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 25 days.

(21) Appl. No.: 13/406,620

(22) Filed: Feb. 28, 2012

(65) Prior Publication Data

US 2012/0222007 A1 Aug. 30, 2012

Related U.S. Application Data

(62) Division of application No. 11/945,421, filed on Nov. 27, 2007.

(51) Int. Cl.
*G06F 9/44* (2006.01)

(52) U.S. Cl.
USPC ........... 717/100; 717/110; 717/112; 717/113; 717/142; 717/122

(58) Field of Classification Search
None
See application file for complete search history.

(56) References Cited

U.S. PATENT DOCUMENTS

2002/0016953 A1 * 2/2002 Sollich .............................. 717/1

* cited by examiner

*Primary Examiner* — Don Wong
*Assistant Examiner* — Deric Ortiz
(74) *Attorney, Agent, or Firm* — Steven M. Greenberg, Esq.; Carey, Rodriguez, Greenberg & O'Keefe

(57) ABSTRACT

Embodiments of the present invention address deficiencies of the art in respect to defect classification for software development and provide a method, system and computer program product for automated defect classification in a software development tool. In an embodiment of the invention, a defect classification method can be provided. The method can include computing differences between versions of a line of source code, lexically analyzing the computed differences to produce a lexical construct, mapping the lexical construct to a classification, and assigning the defect classification to the line of source code.

4 Claims, 2 Drawing Sheets

AUTOMATED DEFECT CLASSIFICATION FOR PROGRAM CODE

CROSS-REFERENCE TO RELATED APPLICATIONS

This application is a Divisional of U.S. application Ser. No. 11/945,421, filed Nov. 27, 2007, currently pending, the entirety of which is incorporated herein by reference.

BACKGROUND OF THE INVENTION

1. Field of the Invention

The present invention relates to a computer program code development tool and more particularly to a defect tracking tool for computer program code.

2. Description of the Related Art

The basic foundation of the software development lifecycle has changed little in the past several decades. Generally, the software development lifecycle begins with a functional specification outlining the required functionality of the computer program followed by a source code implementation of the functional specification. Thereafter, an iterative cycle of code compilation, testing, recoding, recompilation and further testing can unfold in an effort to produce a computer program with as few operational flaws as possible. Subsequently, the computer program can be fielded to end users and feedback can be obtained from the end users. Code revisions and bug fixes can result and the process can repeat throughout the lifespan of the version of the computer program.

The iterative cycle of the software development lifecycle forms the backbone of the process. During the iterative cycle, source code can be modified to address logical and syntactical flaws in the operation of the computer program. When the iterative cycle and indeed when the entire software development process involves but a single software developer, managing the iterative cycle can be elementary. However, modern software development involves multiple different individuals some fulfilling the same role and some fulfilling different roles. To coordinate the behavior of multiple different users during the software development lifecycle, project management systems embodied within integrated development environments track versions of the source code for a computer program and the actions performed by the multiple different users in respect to the source code.

Integrated development environments for software development often include defect detection and classification logic. Defect detection refers to the detection on the part of the integrated development environment of a defect within the source code. Defects can range from syntactical defects where a line of source code runs afoul of the typographical or grammatical requirements of a corresponding computer programming language, to a logical defects in which the functionality of the source code as written fails to implement the functionality of the functional specification implemented by the source code. Detecting a defect in source code from the perspective of the integrated development environment is a matter of observing a change in the source code applied by an end user and receiving a manual classification of the nature of the defect by the end user.

In this regard, defect classification can be integral to the success of a multi-developer software development effort. Through defect classification, other users can readily identify a change in source code applied by another user and the reasons therefore. Further, the manual classification of the defect can alert the other users participating in the development process of the nature of the defect so that a pattern of defects can be understood by all stakeholders in order to avoid such defects in the future. Notwithstanding, manually classifying a defect in source code is a matter of subjective analysis personal to the user applying the manual classification. To with, different users may classify the same defect differently thus defeating the purpose of the classification of the defect in a multi-developer software development environment.

BRIEF SUMMARY OF THE INVENTION

Embodiments of the present invention address deficiencies of the art in respect to defect classification for software development and provide a novel and non-obvious method, system and computer program product for automated defect classification in a software development tool. In an embodiment of the invention, a defect classification method can be provided. The method can include computing differences between versions of a line of source code, lexically analyzing the computed differences to produce a lexical construct, mapping the lexical construct to a classification, and assigning the defect classification to the line of source code.

In one aspect of the embodiment, lexically analyzing the computed differences to produce a lexical construct can include lexically analyzing the computed differences to produce lexical tokens, and matching the lexical tokens to a grammar to produce the lexical construct. In another aspect of the embodiment, mapping the lexical construct to a classification can include first categorizing the lexical construct to a lexical analyzer category, second categorizing the first categorized lexical construct to a sub-category of the lexical analyzer category, and mapping the lexical construct to a classification associated with the sub-category. In this regard, first categorizing the lexical construct to a lexical analyzer category can include first categorizing the lexical construct to a lexical analyzer category such as assignment/initialization, checking, function/class/object interface/algorithm/method/relationships, interface/object oriented messages, and timing/serialization.

In another embodiment of the invention, a source code development system can be provided. The system can include a host development environment executing in a host computing platform, and automated classification logic coupled to the development environment. The automated defect classification logic can include each of a classification parser, a lexical analyzer, and a mapper. The lexical analyzer can include program code enabled to produce lexical tokens for the differences between two different versions of a line of source code as a defect. The classification parser in turn can include program code enabled to match the lexical tokens to a grammar in order to produce a lexical construct. Finally, the mapper can include program code enabled to compare the lexical construct to coupled category mappings in order to locate a defect classification matching the lexical construct.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for automated defect classification in a software development tool. In accordance with an embodiment of the present invention, changes in lines of source code can be detected as defects and lexically analyzed to produce a lexical construct for comparison with a mapping of lexical constructs to defect classifications. Upon comparison with the mapping, a mapped defect classification can be determined for the lexical construct and applied to the detected defect. In this way, uniformity in defect classification can be applied to the benefit of all reviewers of code defects detected in the source code.

Figure 1:
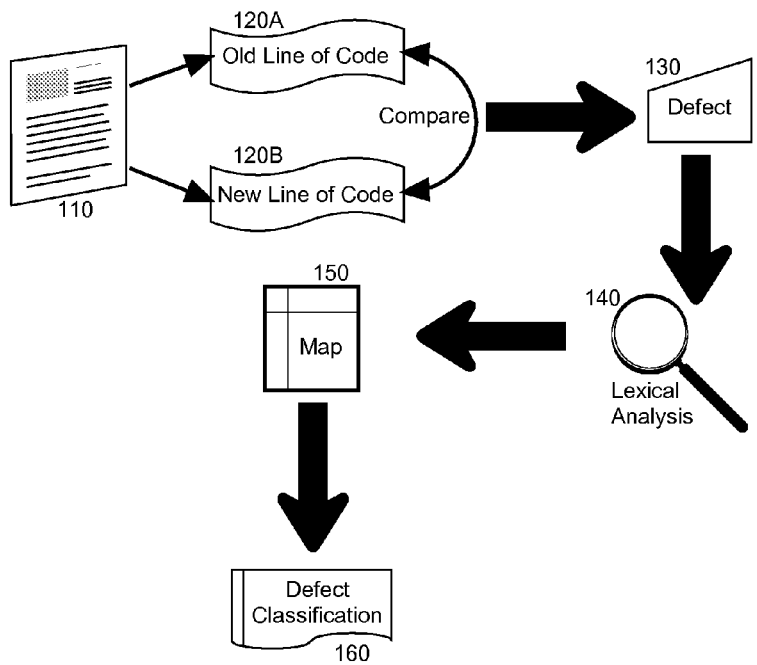
FIG. 1 is a pictorial illustration of a process for automated defect classification in a software development tool.

In further illustration, FIG. 1 is a pictorial illustration of a process for automated defect classification in a software development tool. As shown in FIG. 1, source code 110 can be edited such that changes in the source code 110 can be detected. In respect to a single line of the source code 110, an old line of code 120A before applied changes can be compared to a new line of code 120B in order to identify the defect 130. The defect 130, in essence, can be the difference between the old line of code 120A and the new line of code 120B. Thereafter, the defect 130 can be submitted to lexical analysis h140.

The lexical analysis 140 can parse the defect 130 in order to match a pattern evident in the defect to a known pattern resulting in a lexical construct. Thereafter, the lexical construct can be identified in a map 150 of lexical constructs to defect classifications. For example, the lexical constructs can include an assignment, a condition or branching, an identifier with arguments, multiple changes, imports/extends/includes/exports, interface method and header file changes, and synchronization block and thread waits. Likewise, the lexical constructs can map to assignment/initialization defects, checking defects, function/class/object interface defects, algorithm/method defects, relationships defects, interface/object oriented messages, and timing/serialization defects. A matching defect classification 160 can result and can be associated with the defect 130 for the benefit of other viewers of the changes in the source code 110.

Figure 2:
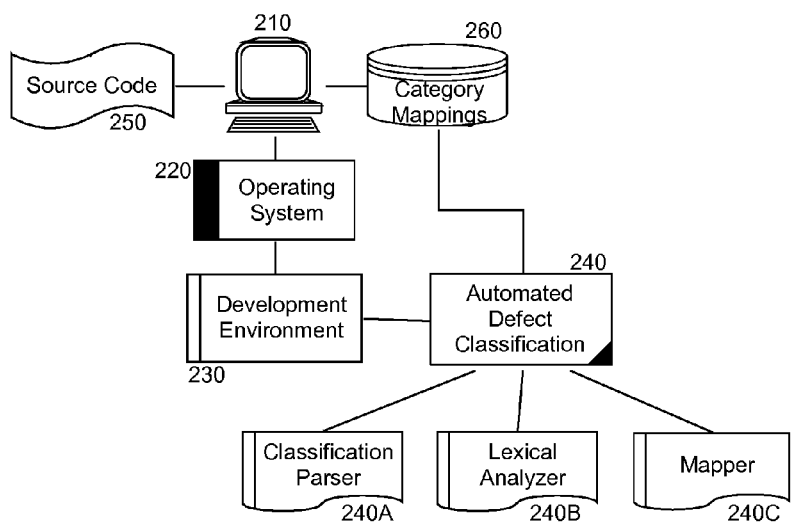
FIG. 2 is a schematic illustration of a software development data processing system configured for automated defect classification in a software development tool; and, FIG. 3 is a flow chart illustrating a process for automated defect classification in a software development tool.

The process shown in FIG. 1 can be implemented within a software development data processing system. In illustration, FIG. 2 schematically depicts a software development data processing system configured for automated defect classification in a software development tool. The system can include a host computing platform 210 supporting an operating system 220. The operating system 220 in turn can host a development environment 230 configured to permit code editing for source code 250. Optionally, the development environment 230 can be a multi-user development environment 230 in which case the development environment 230 can be accessed by other users through other computing platforms (not shown).

Notably, automated defect classification logic 240 can be coupled to the development environment 230. The automated defect classification logic 240 can include a classification parser 240A, a lexical analyzer 240B, and a mapper 240C. The automated defect classification logic 240 further can be coupled to a data store of category mappings 260. The lexical analyzer 240B can include program code enabled to lexically analyze the differences between two different versions of the same line of the source code 250 as a defect. In this regard, the program code of the lexical analyzer 240A can be enabled to produce lexical tokens from the defect which in turn can be parsed according to the program code of the classification parser 240A.

Specifically, the program code of the classification parser 240 can enabled to match the lexical tokens to a grammar in order to produce a lexical construct. The mapper 240C, in turn, can include program code enabled to compare the lexical construct to the category mappings 260 in order to locate a defect classification matching the lexical construct. For example, the following table illustrates a configuration for the category mappings 260.

| Lexical Analyzer Category | Defect Type Category |
|---|---|
| Assignment | Assignment/Initialization |
| Condition and Branching | Checking |
| Program -> Identifier (Arguments) | Function/Class/ObjectInterface |
| Multiple Changes | Algorithm/Method |
| Imports/Extends/Includes/Exports | Relationships |
| Interface method changes, header file changes | Interface/OO Messages |
| Synchronization Blocks/Thread | Waits Timing/Serialization |

Additionally, sub-categorizations can be provided by the category mappings 260. Exemplary sub-categorizations are shown in the following table:

| Lexical Analyzer Category Data | Defect Qualifier Sub-Category |
|---|---|
| Right Hand Assignment Identifier Changed | Assignment- Incorrect |
| Right Hand Assignment Class Identifier Changed | Initialization- Incorrect |
| New Right Hand Assignment Identifier Changed | Initialization- Missing |
| The Operation Changed | Checking- Incorrect |
| New parameter added | Parameter- missing |
| Existing parameter changed | Parameter- incorrect |
| Original Parent Class Changed | Relationship- Incorrect |
| New Parent Class Specified | Relationship- Missing |
| Original Implemented Interfaces Changed | Relationship- Incorrect |
| New Interfaces Specified | Relationship- Missing |
| Access modifier changed | Interface/OO- Incorrect |

Figure 3:
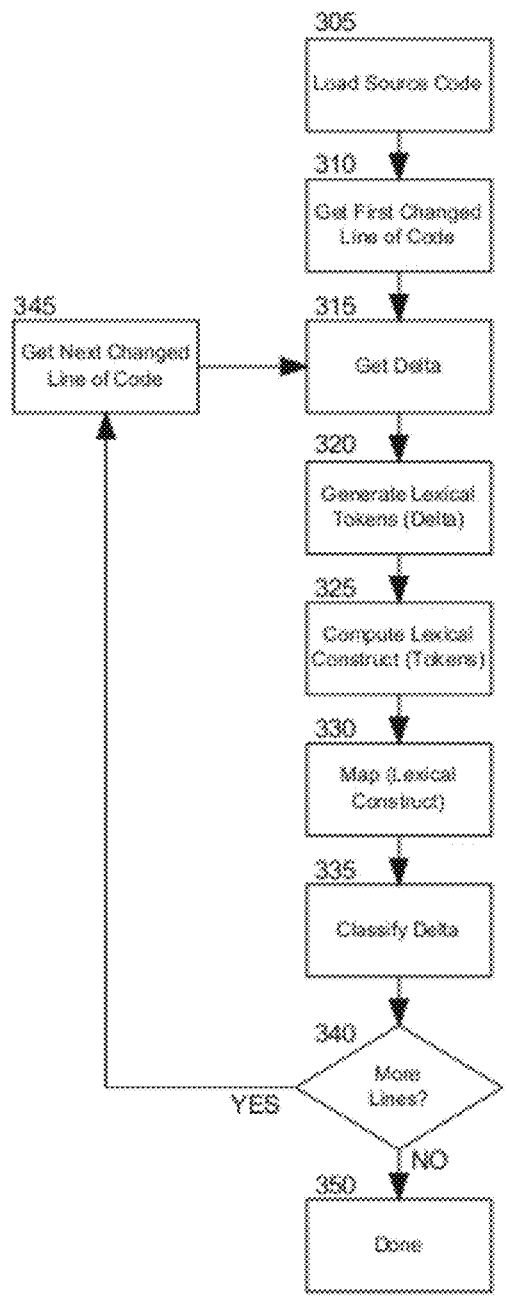

In yet further illustration of the operation of the automated defect classification logic 240, FIG. 3 is a flow chart illustrating a process for automated defect classification in a software development tool. Beginning in block 305, source code can be loaded in which defects are to be detected and classified. In block 310, a first line of changed source code can be selected and in block 315 the differences between a most recent version of the line of source code and a current version of the line of the source code can be determined. Thereafter, in block 320, lexical tokens can be produced for the differences.

In block 325 a lexical construct can be generated for the lexical tokens and in block 330, the lexical construct can be mapped to a defect classification. As such, in block 335 the difference detected as a defect for the line of source code can be classified with the mapped defect classification. Subsequently, in decision block 340 if additional lines of source code remain to be processed, in block 345 a next line of changed source code can be selected for processing and the process can repeat through block 315. Otherwise, when no further changed lines of source remain to be processed, the process can end in block 350.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A defect classification method comprising:
   computing differences between versions of a line of source code;
   lexically analyzing the computed differences to produce a lexical construct;
   mapping the lexical construct to a classification; and,
   assigning the defect classification to the line of source code.

2. The method of claim 1, wherein lexically analyzing the computed differences to produce a lexical construct, comprises:
   lexically analyzing the computed differences to produce lexical tokens; and,
   matching the lexical tokens to a grammar to produce the lexical construct.

3. The method of claim 1, wherein mapping the lexical construct to a classification comprises:
   first categorizing the lexical construct to a lexical analyzer category;
   second categorizing the first categorized lexical construct to a sub-category of the lexical analyzer category; and,
   mapping the lexical construct to a classification associated with the sub-category.

4. The method of claim 3, wherein first categorizing the lexical construct to a lexical analyzer category, comprises first categorizing the lexical construct to a lexical analyzer category selected from the group consisting of assignment/initialization, checking, function/class/object interface/algorithm/method/relationships, interface/object oriented messages, and timing/serialization.

* * * * *